US012632068B2

(12) United States Patent　(10) Patent No.:　US 12,632,068 B2
Oda　(45) Date of Patent:　May 19, 2026

(54) MANAGEMENT SYSTEM AND MANAGEMENT METHOD

(71) Applicant: FUJI CORPORATION, Chiryu (JP)

(72) Inventor: Takuya Oda, Toyoake (JP)

(73) Assignee: FUJI CORPORATION, Chiryu (JP)

( * ) Notice: Subject to any disclaimer, the term of this patent is extended or adjusted under 35 U.S.C. 154(b) by 82 days.

(21) Appl. No.: 18/703,574

(22) PCT Filed: Nov. 8, 2021

(86) PCT No.: PCT/JP2021/041034
§ 371 (c)(1),
(2) Date: Apr. 22, 2024

(87) PCT Pub. No.: WO2023/079755
PCT Pub. Date: May 11, 2023

(65) Prior Publication Data
US 2025/0004483 A1　Jan. 2, 2025

(51) Int. Cl.
*G05D 1/69*　(2024.01)
*G05D 1/646*　(2024.01)
(Continued)

(52) U.S. Cl.
CPC ............... *G05D 1/69* (2024.01); *G05D 1/646* (2024.01); *G05D 1/80* (2024.01); *G05D 2111/32* (2024.01)

(58) Field of Classification Search
None
See application file for complete search history.

(56) References Cited

U.S. PATENT DOCUMENTS

| | | | |
|---|---|---|---|
| 2018/0211548 A1 | 7/2018 | Postrel | |
| 2023/0089977 A1* | 3/2023 | Venkatesh | ............... G08G 5/55 |
| | | | 701/120 |

FOREIGN PATENT DOCUMENTS

| | | | | |
|---|---|---|---|---|
| JP | 2019-40514 A | 3/2019 | | |
| WO | WO-2019041633 A1 * | 3/2019 | ............... | G05D 1/00 |

(Continued)

OTHER PUBLICATIONS

English WIPO translation of WO-2019041633-A1. (Year: 2019).*
International Search Report Issued Dec. 7, 2021, in PCT/JP2021/041034, filed on Nov. 8, 2021, 2 pages.

*Primary Examiner* — Thomas E Worden
*Assistant Examiner* — Christopher A Buksa
(74) *Attorney, Agent, or Firm* — Oblon, McClelland, Maier & Neustadt, L.L.P.

(57) ABSTRACT

A management system includes multiple autonomous moving bodies existing in a predetermined area, and a management device configured to manage the multiple autonomous moving bodies, in which each of the multiple autonomous moving bodies is configured to communicate with both the management device and other autonomous moving bodies, the management device is configured to attempt to transmit a specific instruction for a first autonomous moving body to each of the multiple autonomous moving bodies, when a second autonomous moving body receives the specific instruction from the management device, transmit an instruction corresponding to the specific instruction received from the management device to the first autonomous moving body, and when receiving the instruction corresponding to the specific instruction from the second autonomous moving body, the first autonomous moving executes processing according to the instruction corresponding to the specific instruction received from the second autonomous moving body.

2 Claims, 5 Drawing Sheets

(51) Int. Cl.
G05D 1/80 (2024.01)
G05D 111/30 (2024.01)

(56) References Cited

FOREIGN PATENT DOCUMENTS

| WO | WO 2019/064328 | A1 | 4/2019 |
| WO | WO 2019/225762 | A1 | 11/2019 |

* cited by examiner

MANAGEMENT SYSTEM 2

PREDETERMINED AREA

MANAGEMENT DEVICE
10

AUTONOMOUS MOVING BODY
100

AUTONOMOUS MOVING BODY
100

AUTONOMOUS MOVING BODY
100

AUTONOMOUS MOVING BODY
100

50

MANAGEMENT SYSTEM AND MANAGEMENT METHOD

TECHNICAL FIELD

The technique disclosed in the present description relates to a technique for managing multiple autonomous moving bodies.

BACKGROUND ART

Patent Literature 1 discloses a user-side unit that manages multiple drones. The multiple drones include a master drone and a slave drone. The user-side unit transmits an instruction for the slave drone to the master drone, and the master drone transmits the instruction to the slave drone.

PATENT LITERATURE

Patent Literature 1: JP-A1-2019/064328

BRIEF SUMMARY

Technical Problem

In the technique of Patent Literature 1, it is necessary to assign one of multiple drones to a special master drone in order to manage a slave drone. The present description provides a technique for managing a first autonomous moving body without providing a special autonomous moving body.

Solution to Problem

A management system disclosed in the present description includes: multiple autonomous moving bodies existing in a predetermined area; and a management device configured to manage the multiple autonomous moving bodies, in which each of the multiple autonomous moving bodies is configured to communicate with both the management device and other autonomous moving bodies, the management device is configured to attempt to transmit a specific instruction for a first autonomous moving body among the multiple autonomous moving bodies to each of the multiple autonomous moving bodies, a second autonomous moving body different from the first autonomous moving body among the multiple autonomous moving bodies is configured to, when the second autonomous moving body receives the specific instruction from the management device, transmit an instruction corresponding to the specific instruction received from the management device to the first autonomous moving body, and the first autonomous moving body is configured to, when receiving the instruction corresponding to the specific instruction from the second autonomous moving body, execute processing according to the instruction corresponding to the specific instruction received from the second autonomous moving body.

With the above configuration, the management device can attempt to transmit a specific instruction for the first autonomous moving body to each of the multiple autonomous moving bodies in order to cause the first autonomous moving body to execute processing.

The present description also discloses a management method for managing multiple autonomous moving bodies existing in a predetermined area. The management method includes a first step of attempting to transmit a specific instruction for a first autonomous moving body among the multiple autonomous moving bodies to each of the multiple autonomous moving bodies, a second step of transmitting an instruction corresponding to the specific instruction received in the first step to the first autonomous moving body when a second autonomous moving body different from the first autonomous moving body among the multiple autonomous moving bodies receives the specific instruction transmitted in the first step, and a third step of executing processing according to the instruction corresponding to the specific instruction received from the second autonomous moving body when the first autonomous moving body receives the instruction corresponding to the specific instruction from the second autonomous moving body.

With the above method, it is possible to attempt to transmit a specific instruction for causing the first autonomous moving body to execute processing to each of the multiple autonomous moving bodies.

Figure 1:
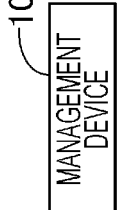
FIG. 1 is a conceptual view of a management system.

DESCRIPTION OF EMBODIMENTS (Configuration of Management System 2: FIG. 1)

Management system 2 according to the example is a system for managing multiple autonomous moving bodies 100 existing in a predetermined area. Management system 2 includes management device 10, access point 50, and multiple autonomous moving bodies 100. The predetermined area is, for example, an indoor area such as a factory or a warehouse, or an outdoor area divided into predetermined ranges.

Access point 50 forms a wireless network according to a predetermined communication method (for example, Wi-Fi method). Hereinafter, access point 50 is referred to as "AP 50". Management device 10 and multiple autonomous moving bodies 100 can participate in a wireless network formed by AP 50. Management device 10 may be connected to AP 50 by wire.

Management device 10 is a device that manages multiple autonomous moving bodies 100. Management device 10 is a device such as a desktop PC, a laptop PC, or a server. Management device 10 may be disposed outside a predetermined area or may be disposed in a predetermined area. Management device 10 can execute, for example, transmission of an instruction to each autonomous moving body 100 via AP 50, reception of information from each autonomous moving body 100 via AP 50, and the like.

Autonomous moving body 100 is a robot that autonomously travels, such as an automatic guided vehicle (AGV) or an autonomous mobile robot (AMR). For example, autonomous moving body 100 measures the surrounding condition and conveys a component to the destination while estimating its own position using the measurement result. The surrounding condition is measured using, for example, a radar or a camera. In a modified example, autonomous moving body 100 may be an autonomously flying robot such as a drone. Further, the autonomous moving body may detect its own position by a GPS sensor.

Figure 2:
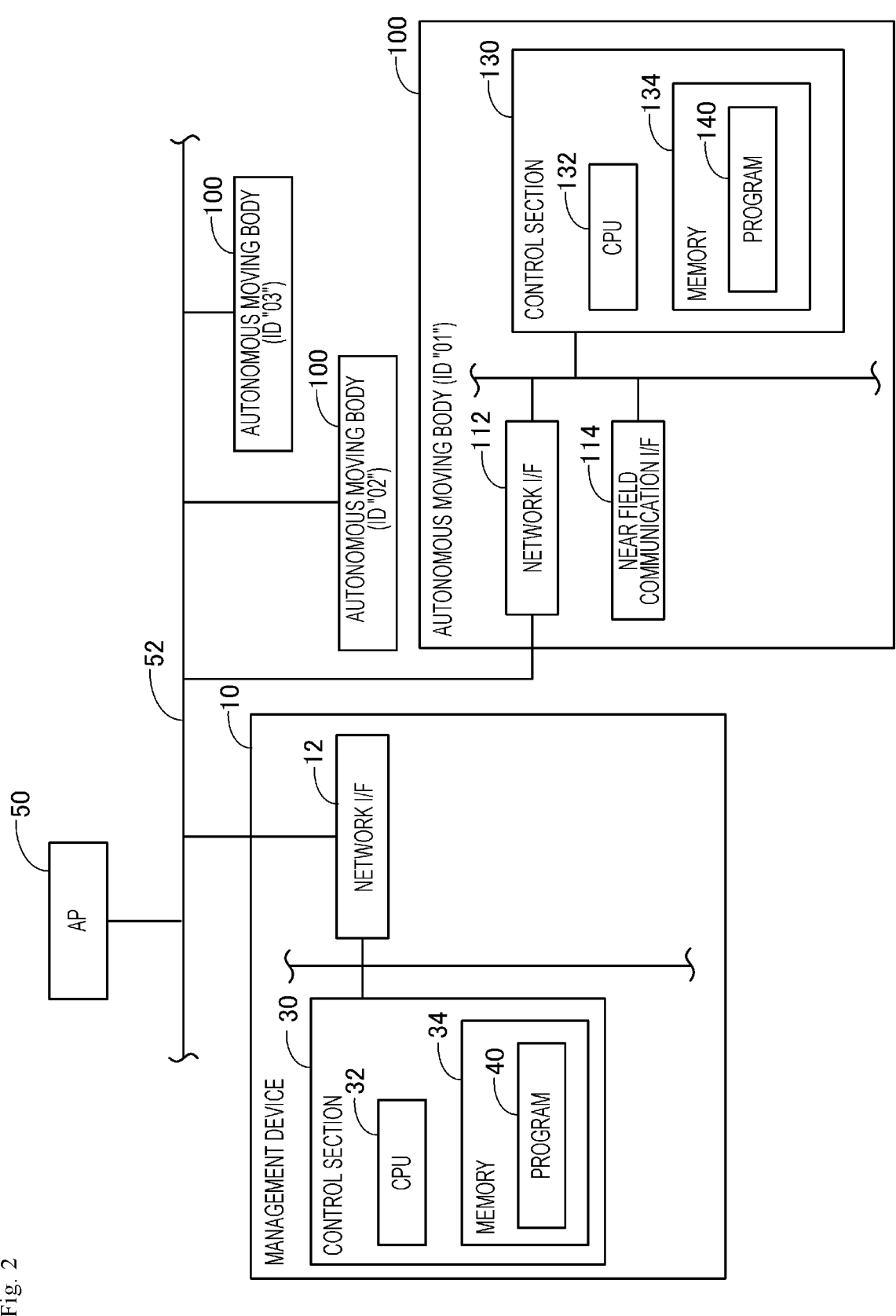
FIG. 2 is a block diagram of the management system.

(Configuration of Management Device 10: FIG. 2)

Management device 10 includes network interface 12 and control section 30. Hereinafter, the "interface" is abbreviated as "I/F".

Network I/F 12 is an I/F for executing communication via wireless network 52 formed by AP 50.

Control section 30 includes CPU 32 and memory 34. CPU 32 executes various types of processing in accordance with program 40 stored in memory 34. Memory 34 includes a volatile memory, a nonvolatile memory, or the like. Program 40 is a program for managing multiple autonomous moving bodies 100. Program 40 is provided by, for example, a vendor of autonomous moving body 100, and is installed in management device 10 by a user of management system 2. (Configuration of Autonomous Moving Body 100: FIG. 2)

Autonomous moving body 100 includes network I/F 112, near field communication I/F 114, and control section 130. Network I/F 112 is an I/F for executing communication via wireless network 52.

Near field communication I/F 114 is an I/F for executing communication according to another communication method different from the predetermined communication method used by network I/F 112. Another communication method is a near field wireless communication method, for example, Bluetooth (registered trademark). Autonomous moving body 100 can communicate with other autonomous moving bodies 100 via near field communication I/F 114.

Control section 130 includes CPU 132 and memory 134. CPU 132 executes various types of processing in accordance with program 140 stored in memory 134.

Figure 3:
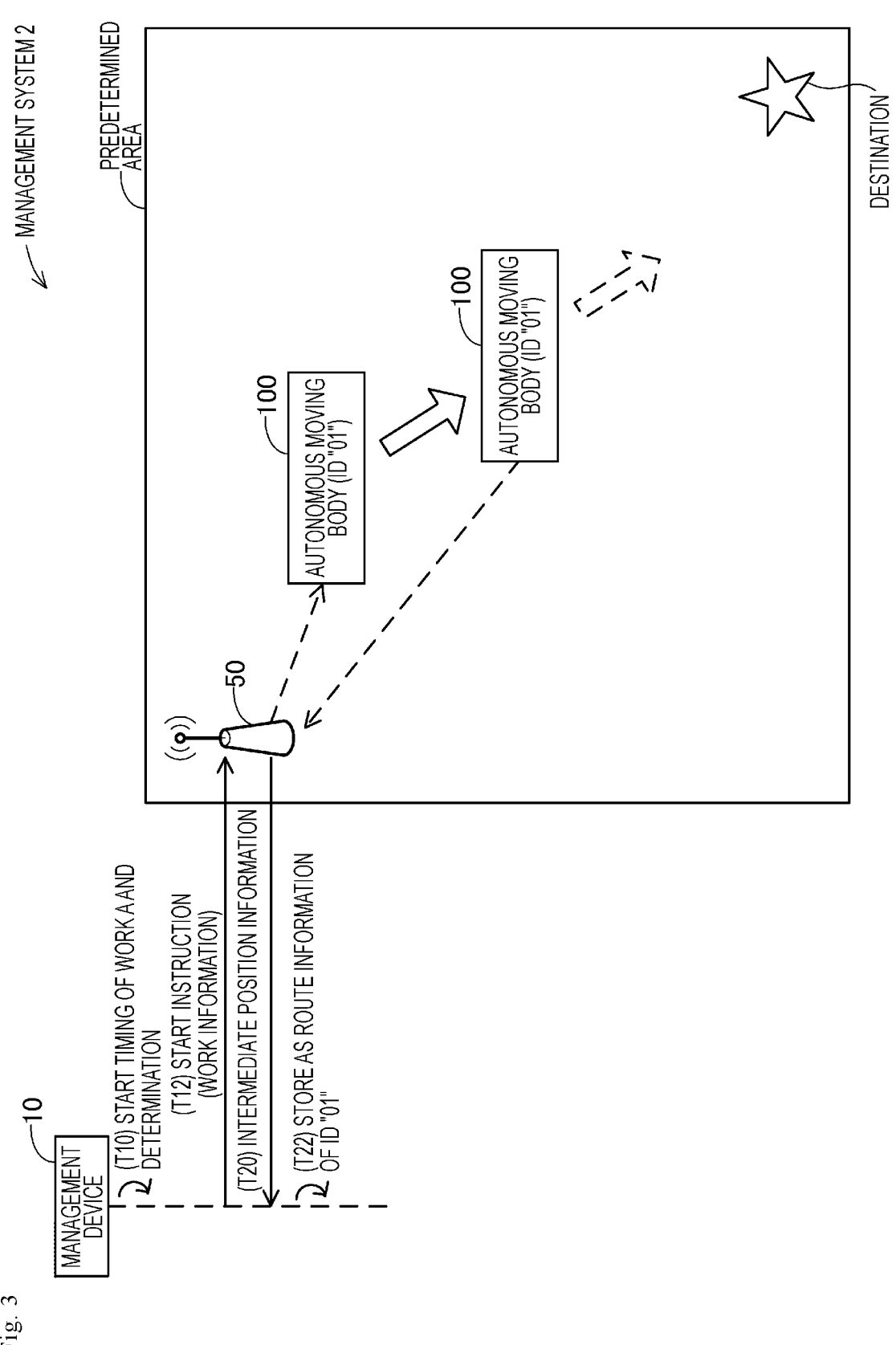
FIG. 3 shows a specific case of starting work.

An ID (for example, ID "01") is assigned to each of multiple autonomous moving bodies 100. In FIGS. 1 and 2, three autonomous moving bodies 100 are illustrated, but the number of autonomous moving bodies 100 is not limited to three, and may be two, four, or more.
(Specific Case of Starting Work: FIG. 3)

A specific case in which predetermined work A is started by autonomous moving body 100 will be described with reference to FIG. 3. Predetermined work A is, for example, a series of work of conveying a predetermined component to a predetermined destination and returning to a predetermined standby place.

In T10, management device 10 determines that the timing of starting predetermined work A has arrived, and executes processing at and after T12. The timing is, for example, a timing at which an instruction, in which the mounting of the component on autonomous moving body 100 with ID "01" (hereinafter, described as autonomous moving body "01") has been completed, is received from the user.

At T12, management device 10 transmits a start instruction indicating an instruction to start work A to autonomous moving body "01" via network I/F 12 and AP 50. The start instruction is a unicast signal addressed to autonomous moving body "01". The start instruction includes work information indicating the content of work A.

When receiving the start instruction from management device 10 via AP 50 and network I/F 112 at T12, autonomous moving body "01" starts moving to the destination indicated by the work information in the start instruction.

At T20, autonomous moving body "01" periodically transmits intermediate position information to management device 10 via network I/F 112 and AP 50 on the route to the destination. The intermediate position information is information indicating the current position of autonomous moving body "01".

Figure 4:
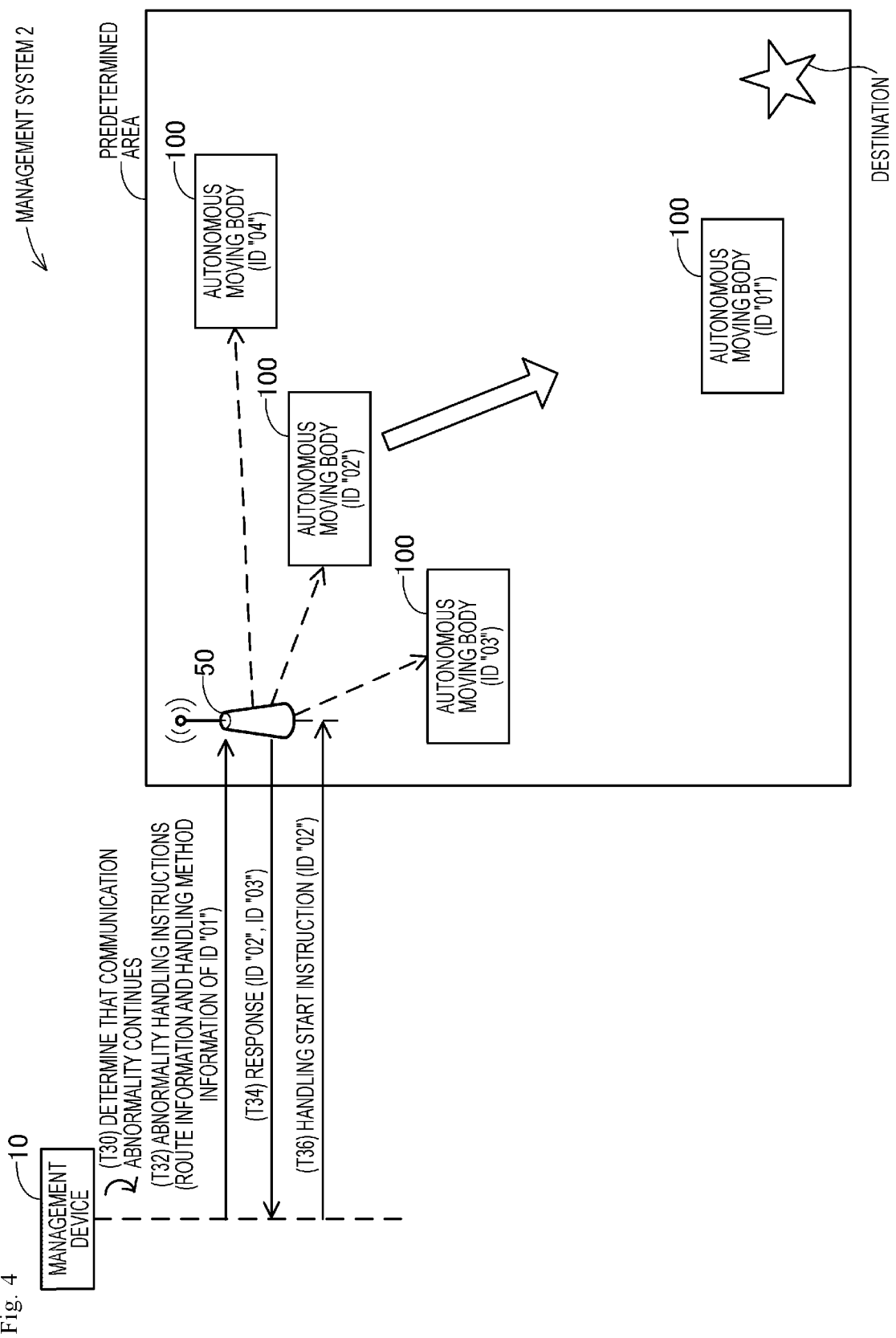
FIG. 4 shows a specific case where an abnormality occurs.
Figure 5:
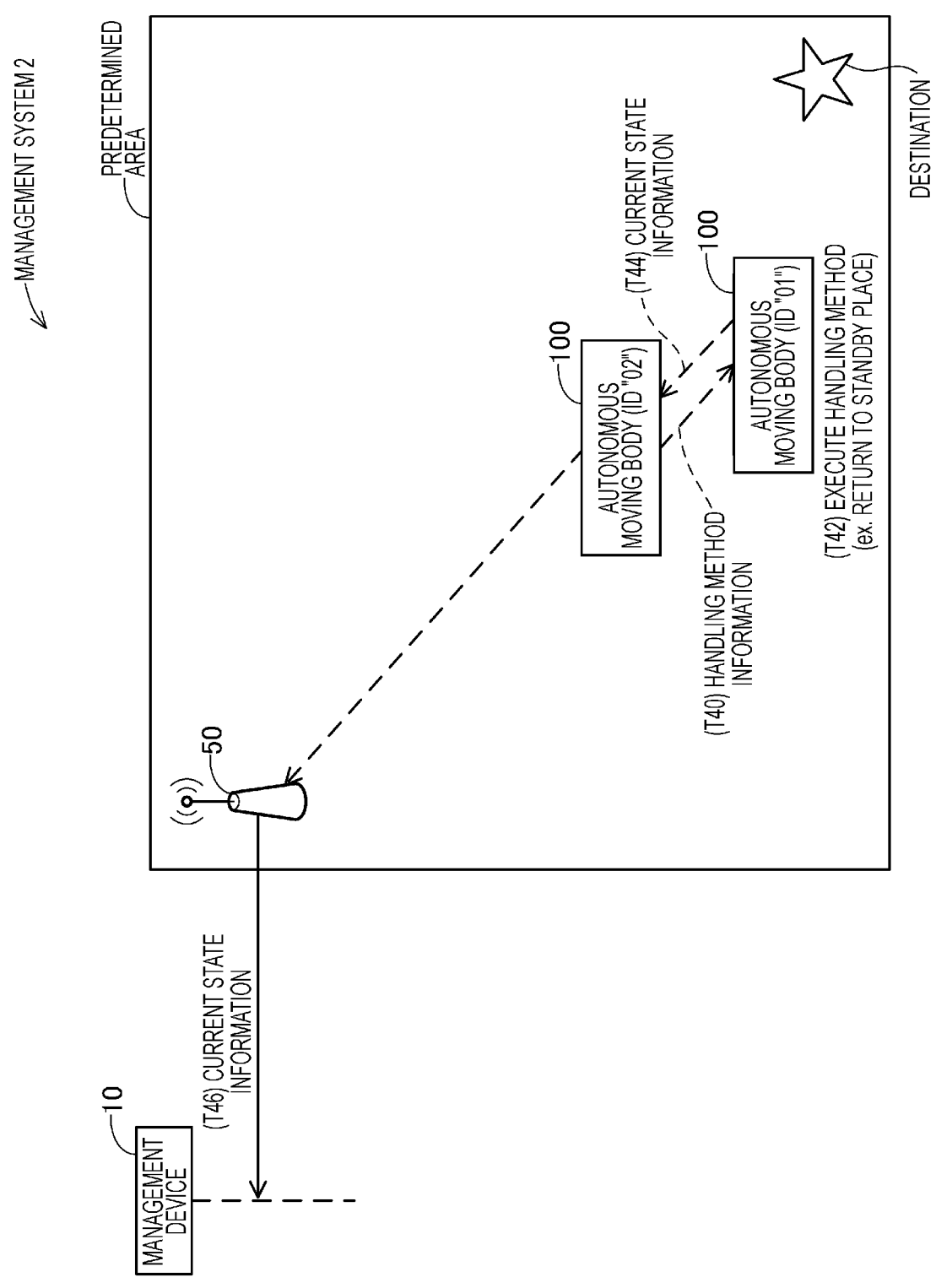
FIG. 5 shows a continuation of FIG. 4.

When the intermediate position information is received from autonomous moving body "0) 1" at T20, management device 10 stores the intermediate position information as route information indicating a route along which autonomous moving body "01" has moved in memory 34 at T22.
(Specific Case where Abnormality Occurs: FIG. 4 and FIG. 5)

The case of FIG. 4 is a continuation of the case of FIG. 3. In the case of FIG. 4, a communication abnormality with autonomous moving body "01" occurs before autonomous moving body "01" arrives the destination. The communication abnormality is, for example, a state in which periodic reception of the intermediate position information is stopped for a predetermined time. The communication abnormality occurs, for example, due to an abnormality inside autonomous moving body "01", communication interruption due to an obstacle, or the like.

At T30, management device 10 determines that the communication state with autonomous moving body "01" remains unreachable for a predetermined time, and executes processing at and after T32.

At T32, management device 10 broadcasts an abnormality handling instruction indicating an instruction for handling the communication abnormality with autonomous moving body "01" to wireless network 52 formed by AP 50. The abnormality handling instruction is a signal in which the destination is not designated. That is, management device 10 attempts to transmit the abnormality handling instruction to all autonomous moving bodies 100 belonging to wireless network 52. The abnormality handling instruction includes the route information of autonomous moving body "01" stored in T22 in FIG. 3 and the handling method information. The handling method information indicates a handling method for the communication abnormality of autonomous moving body "01".

Examples of the handling method include a method of stopping arrival at the destination and causing autonomous moving body "01" to return to a predetermined standby place, a method of causing autonomous moving body "01" to restart movement to the destination, and a method of providing an alternative route to the destination to autonomous moving body "01". Autonomous moving body "01" can select a method suitable for its own current situation from among the various methods. In addition, the handling method may be one specific method (for example, a method of returning to a standby place).

In this case, among multiple autonomous moving bodies 100, three autonomous moving bodies 100 having IDs "02" to "04" (hereinafter, described as autonomous moving body "02", autonomous moving body "03", and autonomous moving body "04") receive the abnormality handling instruction. Here, autonomous moving body "04" ignores the instruction according to the abnormality handling instruction due to the fact that autonomous moving body "04" is currently executing work different from work A. Meanwhile, autonomous moving body "02" and autonomous moving body "03" are currently not executing any work.

At T34, each of autonomous moving body "02" and autonomous moving body "03" transmits a response to the abnormality handling instruction to management device 10 via network I/F 112 and AP 50.

At T34, management device 10 receives responses from autonomous moving body "02" and autonomous moving body "03" via AP 50 and network I/F 12. At subsequent T36, management device 10 selects autonomous moving body "02" from autonomous moving bodies "02" and "0) 3", and transmits a handling start instruction to autonomous moving body "02" via network I/F 12 and AP 50. The handling start instruction indicates an instruction to start an operation according to the abnormality in handling instruction. The handling start instruction is a unicast signal addressed to autonomous moving body "02".

When receiving the handling start instruction via AP 50 and network I/F 112 at T36, autonomous moving body "02" starts moving to approach autonomous moving body "01" using the route information received at T32. Here, the route information received at T32 indicates a route along which autonomous moving body "0) 1" has actually moved before a communication abnormality with autonomous moving body "01" occurs. Autonomous moving body "02" can move along the route on which autonomous moving body "01" has actually moved by using the route information received at T32. Autonomous moving body "02" can approach autonomous moving body "01" to a range in which communication using near field communication I/F 114 can be executed.

In FIG. 5, autonomous moving body "02" moves to the vicinity of autonomous moving body "01". At T40, autonomous moving body "02" transmits the handling method information received at T32 in FIG. 4 to autonomous moving body "01" via near field communication I/F 114. With such a configuration, it is possible to make autonomous moving body "01" know the handling method by using autonomous moving body "02".

When receiving the handling method information from autonomous moving body "02" at T40, autonomous moving body "01" executes the handling method indicated by the handling method information at T42 (for example, returns to the standby place).

At T44, autonomous moving body "01" transmits current state information indicating the current state of autonomous moving body "01" to autonomous moving body "02" via near field communication I/F 114 as a response to the signal of T40. The current state information includes information indicating the content (for example, an abnormality code) of the abnormality of autonomous moving body "01".

When receiving the current state information from autonomous moving body "01" at T44, autonomous moving body "02" transmits the current state information received at T44 to management device 10 via AP 50 and network I/F 112 at T46. Accordingly, management device 10 can know the current state of autonomous moving body "01".

Effects of Present Example

For example, a comparative example is assumed in which one of multiple autonomous moving bodies 100 is assigned to a special autonomous moving body in order to manage autonomous moving body 100 in which the communication abnormality has occurred. In contrast, with the configuration of the present example, management device 10 broadcasts the abnormality handling instruction to the wireless network formed by AP 50 in order to cause autonomous moving body "01" in which the communication abnormality has occurred to execute the handling method (T32 in FIG. 4). That is, management device 10 can attempt to transmit the abnormality handling instruction for autonomous moving body "01" to each of multiple autonomous moving bodies 100 in order to cause autonomous moving body "01" to execute the handling method. That is, the transmission destination of the abnormality handling instruction is not designated to one special autonomous moving body. Autonomous moving body "01" in which the communication abnormality has occurred can be managed without providing a special autonomous moving body. By using autonomous moving body "02" in which no communication abnormality has occurred, it is possible to handle the communication abnormality that has occurred in autonomous moving body "01". (Correspondence Relationship)

Management system 2, management device 10, and multiple autonomous moving bodies 100 are examples of a "management system", a "management device", and "multiple autonomous moving bodies", respectively. Autonomous moving body "01" and autonomous moving body "02" are examples of a "first autonomous moving body" and a "second autonomous moving body", respectively. The abnormality handling instruction at T32 in FIG. 4 is an example of a "specific instruction". The handling method information of T40 in FIG. 5 is an example of an "instruction corresponding to a specific instruction". The route information of T32 and the handling method information of T32 are examples of "route information" and "handling method information", respectively. The processing at T42 in FIG. 5 is an example of "processing".

The points of attention relating to the display device and the system described in the example will be described. The "specific instruction" is not limited to the abnormality handling instruction at T32 in FIG. 4, and may be, for example, an additional instruction for autonomous moving body "01". For example, a situation is assumed in which management device 10 receives a notification indicating some abnormality from autonomous moving body "01" in a state where management device 10 can communicate with autonomous moving body "01". The additional instruction may be an instruction to handle some abnormality mentioned above. In another example, the additional instruction may be an instruction to move to the next destination in a state where no abnormality occurs in autonomous moving body "01".

The abnormality handling instruction at T32 in FIG. 4 may be broadcast in advance to the wireless network formed by AP 50 before the occurrence of the communication abnormality with autonomous moving body "01". In the present modified example, it is possible to omit "a communication state with the first autonomous moving body remains unreachable for a predetermined time".

In the above example, management device 10 determines the transmission destination of the handling start instruction, that is, autonomous moving body "02" that needs to execute the handling for autonomous moving body "01" (T36 in FIG. 4). Instead of this, autonomous moving body "02" and autonomous moving body "03" may execute communication via near field communication I/F 114 to determine which of autonomous moving body "02" and autonomous moving body "03" needs to execute a handling against autonomous moving body "01".

In the above example, the route information and the handling method information are included in the handling start instruction which is a broadcast signal (T32 in FIG. 4). Alternatively, at least one of the route information and the handling method information may be included in the handling start instruction of T36 which is an unicast signal. In the present modified example, the route information and the handling method information included in the unicast signal are examples of "route information" and "handling method information", respectively.

The transmission of the route information at T32 in FIG. 4 need not be executed. In the present modified example, the "route information" can be omitted.

The transmission of the handling method information at T32 in FIG. 4 need not be executed. In the present modified example, the "handling method information" can be omitted.

Technical elements described in the present description or the drawings exhibit technical usefulness alone or in various combinations, and are not limited to combinations described in claims as filed. In addition, the technique described in the present description or the drawings simultaneously achieves multiple purposes, and has technical usefulness with achieving one purpose itself of the multiple purposes.

REFERENCE SIGNS LIST

2: management system, 10: management device, 12: network I/F, 30: control section, 32: CPU, 34: memory, 40: program, 50: access point (AP), 52: wireless network, 100: autonomous moving body, 112: network I/F, 114: near field communication I/F, 130: control section, 132: CPU, 134: memory, 140: program

The invention claimed is:

1. A management system comprising:

multiple autonomous moving bodies existing in a predetermined area; and a management device configured to manage the multiple autonomous moving bodies, wherein each of the multiple autonomous moving bodies is configured to communicate with both the management device and other autonomous moving bodies, the management device is configured to transmit a work instruction to a first autonomous moving body among the multiple autonomous moving bodies, when a communication state with the first autonomous moving body remains unreachable for a predetermined time, determine that an abnormality has occurred in the first autonomous moving body, and transmit abnormality handling instructions including route information of the first autonomous moving body and handling method information indicating a handling method for the abnormality that has occurred in the first autonomous moving body to each of the other multiple autonomous moving bodies, receive responses from each of the other multiple autonomous moving bodies after transmitting the abnormality handling instructions, select a second autonomous moving body among the other multiple autonomous moving bodies based on the received responses, and transmit handling start instructions to the second autonomous moving body to start the abnormality handling instructions, when the second autonomous moving body executes the abnormality handling instructions and is in a vicinity of the first autonomous moving body, the second autonomous moving body transmits the handling method information to the first autonomous moving body, the first autonomous moving body executes the handling method included in the handling method information received from the second autonomous moving body, and transmits current state information to the second autonomous moving body, and the second autonomous moving body transmits the current state information to the management device.

2. A management method for managing multiple autonomous moving bodies existing in a predetermined area, the management method comprising:

transmitting a work instruction to a first autonomous moving body among the multiple autonomous moving bodies;

when a communication state with the first autonomous moving body remains unreachable for a predetermined time, determining that an abnormality has occurred in the first autonomous moving body, and transmitting abnormality handling instructions including route information of the first autonomous moving body and handling method information indicating a handling method for the abnormality that has occurred in the first autonomous moving body to each of the other multiple autonomous moving bodies;

receiving responses from each of the other multiple autonomous moving bodies after transmitting the abnormality handling instructions;

selecting a second autonomous moving body among the other multiple autonomous moving bodies based on the received responses;

transmitting handling start instructions to the second autonomous moving body to start the abnormality handling instructions; and when the second autonomous moving body executes the abnormality handling instructions and is in a vicinity of the first autonomous moving body transmitting, by the second autonomous moving body, the handling method information to the first autonomous moving body, executing, by the first autonomous moving body, the handling method included in the handling method information received from the second autonomous moving body, and transmitting, by the first autonomous moving body, current state information to the second autonomous moving body, and transmitting, by the second autonomous moving body, the current state information to a management device.

* * * * *